United States Patent [19]
Kronseder

[11] Patent Number: 5,893,700
[45] Date of Patent: Apr. 13, 1999

[54] TRANSPORT STAR FOR CONTAINERS

[76] Inventor: Hermann Kronseder, Regensburgerstrasse 42, 93086 Wörth/Donau, Germany

[21] Appl. No.: 08/801,845

[22] Filed: Feb. 21, 1997

[30] Foreign Application Priority Data

Mar. 13, 1996 [DE] Germany .............. 296 04 535 U
May 2, 1996 [DE] Germany .............. 296 07 937 U

[51] Int. Cl.$^6$ ............................................. B66C 23/00
[52] U.S. Cl. ............................. 414/744.2; 198/803.9; 294/116
[58] Field of Search ................ 414/744.2; 198/470.1, 198/803.9; 294/116

[56] References Cited

U.S. PATENT DOCUMENTS 3,401,974  9/1968  Martelee ..................... 294/116 X
3,471,191 10/1969  Schwab ....................... 294/116
4,638,906  1/1987  Winiasz ...................... 198/803.9

FOREIGN PATENT DOCUMENTS 295 01 897 U  2/1995  Germany ............ B65G 47/86

*Primary Examiner*—Donald W. Underwood
*Attorney, Agent, or Firm*—Tilton, Fallon, Lungmus & Chestnut

[57] ABSTRACT

Transport star for containers with a basic body which can rotate, on whose circumference several gripper arms, in the form of double levers, are attached in bearings, which can be locked by selflocking in the closed position by means of spreader bodies which are arranged in the basic body so they can rotate. Each gripper arm consists of two parts which are connected to each other by articulation, between which a spring element is inserted, which can be elastically deformed in the closed position. As a result the duration of use of the gripper arms is increased and the range of diameters for the containers to be processed is considerably increased.

13 Claims, 2 Drawing Sheets

TRANSPORT STAR FOR CONTAINERS

BACKGROUND

1. Field of the Invention

The invention relates to a transport star for containers.

2. Description of the Prior Art

Such a transport star is already known, in which the gripper arms consist of a tough elastic plastic and are formed as a single-part double lever (DE-GM 295 01 897.6). The fact that the gripper arms can thus be completely bent, elastically, is required, on the one hand, in order to build up the necessary clamping force during the grabbing of the containers and, on the other hand, in order to stabilize, in a self-locking manner, the spreader bodies that are in the form of rotating cams in connection with notch-like recesses in the counter surfaces in the closed positions. Due to the manufacture in the form of a one-piece plastic part, the gripper arms of the known transport system can be manufactured in an extremely cost-effective manner. The drawback is that the elasticity decreases over time and, because of the limited deformability, it can be used only for a precisely defined container diameter with narrow tolerances.

The invention is based on the problem of achieving, using a transport star of the type mentioned in the introduction, and employing simple means, a considerable increase in the life-span of the gripper arms and in the range of diameters of the containers to be processed.

SUMMARY OF THE INVENTION

In a transport star according to the invention, the gripper arms themselves or their parts must not be deformed during the grabbing of the containers. The elastic elements are deformed, which, for the purpose of a long life-span and a large diameter range, can be adapted specifically to their single usage purpose.

Therefore, it is possible without any problem to construct the parts of the gripper arm so that they are resistant to bending, and so that the elastic deformation and the generation of the clamping force is achieved exclusively by the spring elements.

DESCRIPTION OF THE DRAWINGS

An embodiment example of the invention is described below with a reference to the drawings, in which.

DETAILED DESCRIPTION OF THE PREFERRED EMBODIMENTS

Figure 1:
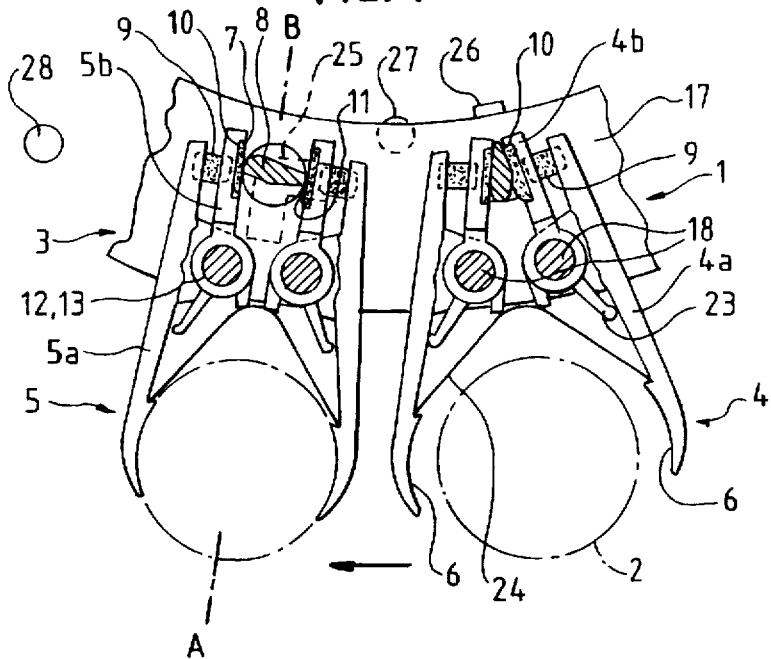
FIG. 1 represents a partial top view of a transport star.
Figure 2:
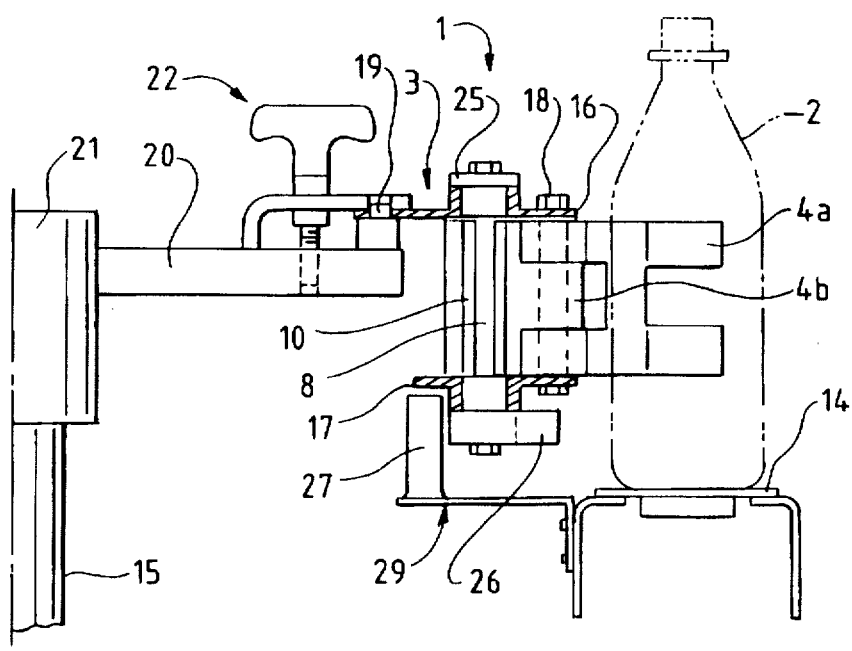
FIG. 2 represents section A-B according to FIG. 1.

The transport star 1 according to FIGS. 1 and 2 is arranged for the transport of containers in the form of bottles 2, standing in the upright position. It is integrated in the inlet of a bottle processing machine, for example an inspection machine; of the latter machine's other components, only the conveyor 14 and the drive shaft 15 for the transport star 1 are represented.

Figure 2A:
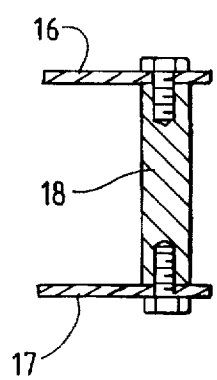
FIG. 2a represents an enlarged cross-section view of a bolt connecting two rings of a transport star and attached to the rings by means of screws.

The transport star 1 presents a basic body 3 which consists essentially of two parallel, circular rings 16, 17. The two rings 16, 17 have the same external diameter; the internal diameters differ, and the internal diameter of the upper ring 16 is smaller than that of the internal diameter of the lower ring 17. The two rings 16, 17 are arranged concentrically and they are rigidly connected to each other by a number of pairs of bolts 18 with circular cross-section distributed over their circumference. Each bolt 18 is attached by means of two screws, which can be loosened individually between the two rings 16, 17, as shown in FIG. 2a.

The top ring 16 presents on its internal side several holes, which are evenly distributed over the circumference, and which sit on pegs 19. The latter in turn are attached to the ends of several radial arms 20 of a hub 21, which is connected in a manner with torsional strength a drive shaft 150 By means of several manual clamping installations 22, which act on the top ring 16, the basic body 3 is clamped onto the arms 20 in a removable manner and oriented with its middle axis concentrically with respect to the drive shaft 15.

A gripper arm 4, 5 is located in a tilt bearing on each bolt 18. The two gripper arms 4, 5 of a pair of associated bolts 18 are formed, in a mirror image like double levers, and together they form a grip pliers which can grab a bottle 2 with non-positive and positive locking.

Each gripper arm 4, 5 presents two parts a and b which are made, for example, of a hard plastic with high resistance to bending, and thus present intrinsic resistance to bending. In each case, the first parts 4a, 5a are formed in the form of double levers which are located in bearings which allow them to be tilted in the lower and upper marginal area of the parts, with formation of a recess in the middle part, directly on the bolts 18. At their ends which are turned radially towards the outside, the first parts 4a, 5a are provided with gripper surfaces 6, which are in the form of bowls and directed toward each other, for the bottles 2. In each case the second parts 4b, 5b of each gripper arm 4, 5 are essentially in the form of simple levers, which are located in a bearing which allows them to be tilted, in the mid-height area in the recess of the first part 4a, 5a, also directly on the bolts 18. At the radial ends which are turned towards the interior, the second parts 4b, 5b are provided with counter surfaces 7, turned towards each other, for a spreader body 8. The counter surfaces 7 are formed at the inserts 10 made of highly wear-resistant plastic, the inserts being attached by means of dovetail guides, in a removable or exchangeable manner, to the parts 4b, 5b.

Because of the bearings described above, the parts 4a, b; 5a, b of each gripper arm 4, 5 can be tilted either together or independently of each other. The bolts 18 thus form both tilt bearings 13 for the gripper arms 4, 5 as a whole and also articulations 12 for the relative movement of the parts 4a, b; 5a, b with respect to each other. This relative movement is limited in one direction by mean of abutments 23 which are formed at the second parts 4b, 5b.

Between the areas of the parts 4a, b; 5a, b, which parts are turned radially towards the interior and which run essentially parallel, spring elements 9 are inserted, in the form of longitudinal cushions made of elastic plastic, for example silicon, in corresponding recesses at the inserted parts. The spring elements 9 extend over the entire height of the gripper arms 4, 5 and they tend to press the parts 4a, b; 5a, b apart, to the extent allowed by the abutments 23. The spring elements 9 are arranged immediately behind the inserts 10 with the counter surfaces 7 and they permit an elastic relative movement between the parts 4a, b; 5a, b, where the articulations 12, in accordance with their function, are located between the counter surfaces 7 and the gripper surfaces 6, and they are arranged concentrically with respect to the tilt bearings 13 of the gripper arms 4, 5. Furthermore, between the parts 4a, 5a of two associated gripper arms 4, 5, in connection with the gripper surfaces 6, V-shaped spring leaves 24 are inserted with tension, which tend to press apart the gripper arms 4, 5 in the area of the gripper surfaces 6, or which apply preliminary tension to the gripper arms 4, 5 in the opening direction.

In parallel to each pair of bolts 18, in the middle between the parts 4b, 5b of two associated gripper arms 4, 5, a control shaft 25 is located in each case in a bearing which allows rotation in the rings 16, 17. The latter shaft, at the height level between the rings 16, 17 presents a recess-shaped spreader body 8 whose cross-section is essentially oval, which is formed directly by corresponding flattened sections of the control shaft 25, where the flattened sections run partly in parallel. If the spreader body 8 with its parallel lateral surfaces is located essentially radially with respect to the axis of rotation of the transport star 1, then it defines the open position of the gripper arms 4, 5, because in that case the counter surfaces 7 are as close as possible to each other and the gripper surfaces 6 are as far as possible from each other (FIG. 1, right side). Here the counter surfaces 7 are applied, due to the influence of the spring leaf 24, to the lateral surfaces of the spreader body 8, and the bottle 2 can move without hindrance between the open gripper arms 4, 5. Here the spring elements 9 transfer the force applied by the spring leaves 24 onto the parts 4a, 5a onto the parts 4b, 5b.

If the spreader body 8 with its parallel lateral surfaces is essentially tangent to the rotatory axis of the transport star 1, then it defines the closed position of the gripper arm 4, 5, because in that case the counter surfaces 7 are as far as possible from each other and the gripper surfaces 6 are as close as possible to each other (FIG. 1, left side). If no bottle 2 is present, then the counter surfaces 7 are applied only due to the action of the spring leaf 24, which is under tension, onto the small front surfaces of the spreader body 8, where, as a result of a raised section 11 on one of the two counter surfaces 7, the spreader body 8 is attached slightly above the dead point and it is thus stabilized in a self-inhibitory manner. In this case as well, the force generated by the spring leaf 24 is transferred through the spring elements 9 which may then be slightly compressed. The separation between the gripper surfaces 6 is less than the smallest bottle diameter to be processed.

Figure 1A:
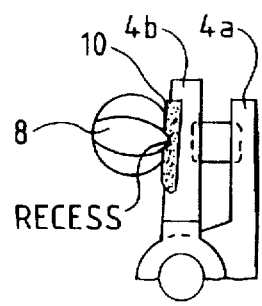
FIG. 1a represents an enlarged partial top view, cut away, of a section of a gripper arm for a transport star, showing an insert attached to the gripper arm, with the insert having a recess for receiving a spreader body therein.

Alternatively, as shown in FIG. 1a, the insert 10 may have a recess therein for receiving the spreader body 8 when the spreader body 8 with its parallel lateral surfaces is essentially tangent to the rotary axis of the transport star 1.

If a bottle 2 is present, in the closed position of the spreader body 8 or the gripper arms 4, 5 between the latter, then the parts 4b, 5b with the counter surfaces 7 assume the same position. The parts 4a, 5a are however further removed from each other in the area of the gripper surfaces 6, a situation made possible by the articulations 12. The result of this is a stronger compression of the spring elements 9, which thus generate the clamping force required to achieve a reliable holding of the bottles 2. The design is selected, for example, in such a manner that the gripper arms 4, 5 are capable of firmly grabbing bottles 2 having a diameter range of 60–70 mm, without the spring elements 9 being compressed during that process by more than one-third. As a result the life-span of the spring elements 9 is almost limitless. Nevertheless, it is possible to transport, without problems, bottles 2 having a larger range without readjustment or exchange of the transport star 1. The clamping force built up by the compression of the spring elements 9 additionally stabilize the spreader body 8, which is thus stable both in the open position and in the closed position, without requiring any additional retaining means.

The lower end of each control shaft 25 extends slightly out of the lower ring 17. On these protecting ends, angular control levers 26 are attached. They work in cooperation with abutment bolts 27, 28 which are stationary below the transport star 1 The first abutment bolt 27 is arranged on the internal side of the peripheral path of the control shaft 25. It swings a passing spreader body 8 in the direction of the arrow with the transport star 1 by approximately 90° from the open position into the closed position. The second abutment bolt 28 is arranged on the external side of the peripheral path of the control shaft 27. It swings a passing spreader body 8 by approximately 90° from the open position into the closed position. By the use of other rigid abutment bolts, or abutment bolts with adjustable height, a reliable opening and closing of the gripper arms 4, 5 is possible at any place of the peripheral path of the transport star 1. The bottles 2 can thus be transferred without additional guidance curvatures etc. in a targeted manner from a conveyor 14 to a rotating table, not shown, or from the rotating table to several different conveyors for removal, or they can be sorted, or transferred by means of a similar transport star with gripper arms having adjustable heights.

It is also possible to provide only one gripper arm with articulation 12 and spring elements 9, and to design the other gripper arm without articulation, that is in a rigid manner and/or in a manner which prevents rotation at the basic body and/or to couple it to the spring-loaded gripper arm by means of a drive system which allows for the reversal of the direction of rotation. Furthermore it is conceivable to associate each gripper arm with its own spreader body.

Figure 3:
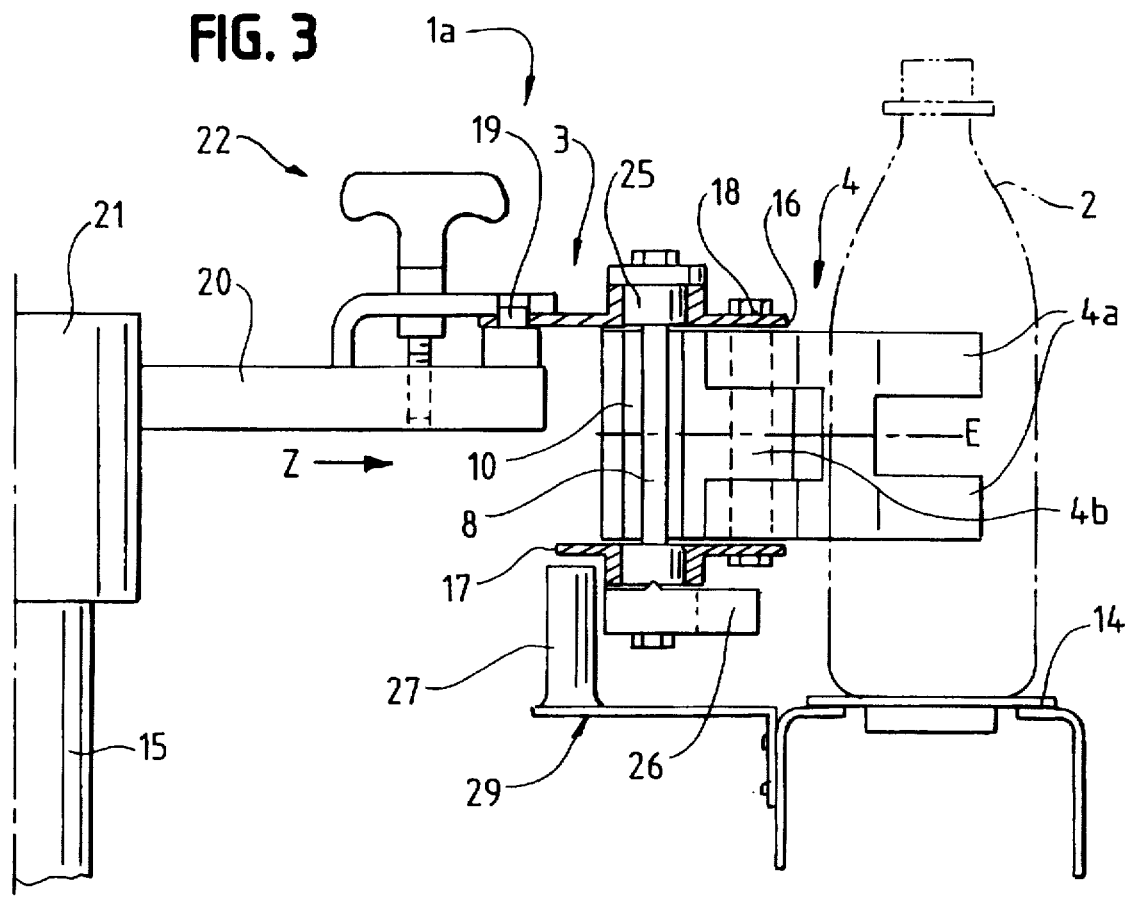
FIG. 3 represents section A-B in another embodiment of the transport star.
Figure 4:
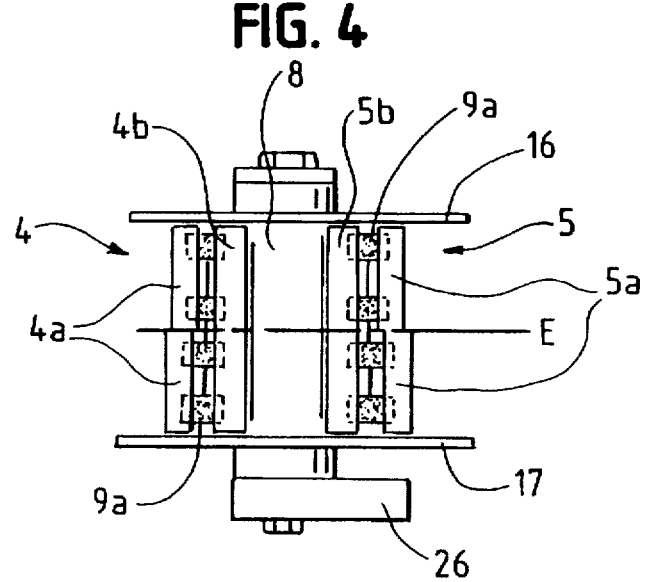
FIG. 4 represents the view Z according to FIG. 3.

The transport star 1a according to FIGS. 3 and 4 differs from transport star 1 according to FIGS. 1 and 2 in that the parts 4a, 5a, which are of the double-lever type, of each gripper arm 4, 5, are completely separated in a horizontal cutting plane E in the mid-height area, vertical with respect to the tilt axes of the gripper arms 4, 5. Each gripper arm 4, 5 thus has two parts 4a, 5a, of the double-lever form, which can be tilted with respect to each other. The parts 4b, 5b, on the other hand, which are in the form of a simple lever, are not separated.

The two parts 4a, 5a which belong to each other, are braced by a means of a spring element 9a on the associated single part 4b, 5b. As shown in FIG. 4, each spring element 9a presents four elastic cylindrical cushions which are connected by means of a thin, flexible flange. In each case two elastic cushions act in cooperation with the upper parts 4a, 5a, whereas the two upper elastic cushions work in cooperation with the lower part 4a, 5a. The two parts 4a, 5a of each gripper arm 4, 5 can thus be adapted separately to the contour of a bottle 2 which is being grabbed, when the spreader body 8 which grabs the parts 4b, 5b assumes its closed position. In this process, the elastic cushions of the spring elements 9a can be compressed to varying degrees, shown in FIG. 4. In this manner, so-called contour or shaped bottles can also be reliably grabbed and reliably held by a surface which does not have a cylindrical shape.

I claim:

1. A transport star for containers comprising in combination a basic body which can rotate, a plurality of gripper arms swingably mounted at the circumference of said basic body, said gripper arms formed as two-arm levers, the ends of said gripper arms pointing outwardly from an axis of rotation of each of said gripper arms, gripper surfaces provided on said gripper arms for the containers, the distal ends of said gripper surfaces pointing radially inwardly toward said axis of rotation of each of said gripper arms, counter surfaces provided for spreader bodies which are attached, in a manner so they can be moved, in said basic body, where said spreader bodies latch said gripper arms in a closed position, which is self-supporting, and which holds the containers to be grabbed, each of said gripped arms (4, 5) having at least two parts (4a, b; 5a, b) which are connected by means of an articulation to each other, each of said two parts bears one of said gripper surface (6) and said counter surface (7), at least one spring element(9, 9a) engages on said at least two parts (4a, b; 5a, b), said spring element elastically deformed in said closed position of said gripper arm (4, 5), and said spreader bodies being controlled by an actuator.

2. A transport star according to claim 1, wherein said at least two parts (4a, b; 5a, b) of said gripper arms (4, 5) are resistant to bending.

3. A transport star according to claim 1, wherein said counter surfaces (7) for said spreader bodies (8) are formed from wear resistant material at inserts (10) which are attached in a removable manner to the other of said at least two parts (4b, 5b) of said gripper arms (4, 5).

4. A transport star according to claim 3, wherein said inserts (10) have raised sections (11) and recesses for the attachment of said spreader bodies (8) in said closed position.

5. A transport star according to claim 1, and said gripper arms (4,5) have tilt bearings (13) and wherein said articulations (12) between said at least two parts (4a, b; 5a, b) of said gripper arms (4, 5) are arranged concentrically with respect to said tilt bearings (13).

6. A transport star according to claim 1, wherein said at least one spring element (9, 9a) is formed of one or more cushions, consisting of elastic material.

7. A transport star according to claim 6, wherein the two parts of each said gripper arm (4, 5) has at least one first part (4a, 5a) in the form of said two-arm lever and a second part (4b, 5b) in the form of a simple lever, and said at least one spring element (9, 9a) is inserted between adjacent areas of said first and second parts (4a, b; 5a, b).

8. A transport star according to claim 7 wherein said parts (4a, 5a), in the form of said two-arm levers, bear said gripper surface (6), and said second parts (4b, 5b), in the form of said simple levers, bear said counter surface (7).

9. A transport star according to claim 8, wherein said second parts (4b, 5b), in the form of said simple lever, run essentially inwardly toward said axis of rotation of each of said gripper arms.

10. A transport star according to claim 1, wherein said spreader bodies (8) consist of cams which are located in bearings parallel to a tilt axis of each of said gripper arms (4, 5) in a manner so they can rotate in said basic body (3).

11. A transport star according to claim 10 wherein said spreader bodies (8) are connected in a fixed manner to a control lever (26), which effects, together with stationary abutment bolts (27, 28) arranged adjacent the periphery of said transport star (1), a rotation of said spreader body (8) and thus an opening or closing of said gripper arm (4, 5).

12. A transport star according to claim 1, wherein each said gripper arm (4, 5) presents at least two of said first parts (4a, 5a), which can be tilted one relative to the other.

13. A transport star according to claim 12, wherein all said first parts (4a, 5a), in the form of said double lever, of said gripper arm (4, 5) must be braced by means of at least one said spring element (9a) on a single part (4b, 5b) in the form of a simple lever.

* * * * *